United States Patent
Monty et al.

(10) Patent No.: US 6,675,582 B2
(45) Date of Patent: Jan. 13, 2004

(54) SLOT COOLED COMBUSTOR LINE

(75) Inventors: Joseph Douglas Monty, Boxford, MA (US); John C. Jacobson, Melrose, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/864,019

(22) Filed: May 23, 2001

(65) Prior Publication Data

US 2002/0174658 A1 Nov. 28, 2002

(51) Int. Cl.[7] .................................................. F23R 3/06
(52) U.S. Cl. ............................. 60/752; 60/756; 60/757
(58) Field of Search ......................... 60/752, 755, 756, 60/757, 754

(56) References Cited

U.S. PATENT DOCUMENTS

| | | | |
|---|---|---|---|
| 1,138,547 A | | 5/1915 | Campbell |
| 1,432,316 A | | 10/1922 | Cowley |
| 2,699,648 A | * | 1/1955 | Berkey .................... 60/757 |
| 3,369,363 A | | 2/1968 | Campbell |
| 3,845,620 A | * | 11/1974 | Kenworthy ................ 60/757 |
| 3,995,422 A | * | 12/1976 | Stamm ..................... 60/757 |
| 4,380,906 A | | 4/1983 | Dierberger |
| 4,485,630 A | | 12/1984 | Kenworthy |
| 4,566,280 A | * | 1/1986 | Burr ........................ 60/757 |
| 4,655,044 A | | 4/1987 | Dierberger et al. |
| 4,773,593 A | * | 9/1988 | Auxier et al. ............. 60/757 |
| 4,787,209 A | * | 11/1988 | Taylor et al. ............. 60/757 |
| 5,123,248 A | * | 6/1992 | Monty et al. ............. 60/752 |
| 6,250,082 B1 | * | 6/2001 | Hagle et al. ............. 60/753 |

FOREIGN PATENT DOCUMENTS

| | | | | |
|---|---|---|---|---|
| EP | 0049190 | * | 4/1982 | .......... 60/757 |
| JP | 0091131 | * | 7/1981 | .......... 60/755 |

* cited by examiner

*Primary Examiner*—Ted Kim
(74) *Attorney, Agent, or Firm*—William Scott Andes; Pierce Atwood

(57) ABSTRACT

A combustor liner for use in a gas turbine engine includes an annular panel section having a cooling nugget formed on one end thereof. An annular cooling lip is formed on the cooling nugget so as to define a cooling slot. The cooling lip includes a hot side, a cold side and a trailing edge surface. The hot side defines a compound taper for minimizing the thickness of the trailing edge surface. In one embodiment, the compound taper includes a first tapered surface disposed on a forward portion of the cooling lip and a second tapered surface disposed on an aft portion of the cooling lip, wherein the second tapered surface has a greater taper than the first tapered surface.

8 Claims, 2 Drawing Sheets

SLOT COOLED COMBUSTOR LINE

BACKGROUND OF THE INVENTION

This invention relates generally to gas turbine engines and more particularly to slot cooled combustor liners used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustor liners. The liners contain the combustion process and facilitate the distribution of air to the various combustor zones in prescribed amounts.

Because they are exposed to intense heat generated by the combustion process, combustor liners are cooled to meet life expectancy requirements. Liner cooling is commonly provided by diverting a portion of the compressed air (which is relatively cool) and causing it to flow over the outer surfaces of the liners. In addition, a thin layer of cooling air is provided along the combustion side of the liners by directing cooling air flow through cooling holes formed in the liners. This technique, referred to as film cooling, reduces the overall thermal load on the liners because the mass flow through the cooling holes dilutes the hot combustion gas next to the liner surfaces, and the flow through the holes provides convective cooling of the liner walls.

In one known configuration, film cooled combustor liners include a series of connected panel sections with a bump or nugget formed on the forward end of each panel section. Each nugget has an axially oriented slot formed on the hot gas side thereof, and a plurality of cooling holes is formed in each nugget. Compressor discharge air passes through the cooling holes and exits the cooling slots to produce the film of cooling air on the hot gas side of the corresponding panel section.

It is also known to use a thermal barrier coating on the hot gas side of combustor liners for providing further protection from the high temperatures of combustion. Thermal barrier coatings typically comprise a bond coat having a composition similar to the base material and a ceramic top coat.

Each cooling slot defines an overhanging portion, also known as a cooling lip, which is exposed to the hot combustion gas. Cooling lips must be sufficiently thick for structural reasons. As a result, cooling lips have bluff trailing edge surfaces of significant thickness relative to cooling slot height. Because of the inherently separated flow off this bluff trailing edge surface, and the fact that the surface has a significant view factor to the combustion flame, there is substantial heat input to the trailing edge surface. The gas conditions on the trailing edge surface typically comprise a mix between the cooling air temperature and the hot gas temperature, thereby further adding to the heat input. Thus, despite the fact that jets of air from the cooling holes cool the cooling lip generally, the heat input through the bluff trailing edge surface can significantly increase liner metal temperatures and reduce service life.

To reduce the effects of trailing edge heat input, it is known to taper the cooling lip such that the thickest portion is at the base and the thinnest portion is at the trailing edge. This configuration reduces the trailing edge surface thickness while maintaining structural stability to resist buckling. Taper angles between 5 and 10 degrees from parallel are commonly used. With such taper angles, conventional liners have trailing edge thicknesses of approximately 0.050 to 0.060 inches. Thus, while tapering the cooling lip reduces the thickness of the bluff trailing edge surface, the surface is still relatively thick. Furthermore, increasingly thicker ceramic top coats are being used in thermal barrier coatings as a way of extending the life of combustor liners. This has the effect of increasing the overall thickness of the bluff trailing edge surface, thereby increasing the exposed area of the trailing edge. It also increases mainstream turbulence at the cooling slot exit, which degrades the downstream effectiveness of the cooling film.

It would be theoretically possible to achieve thinner trailing edge thickness by applying a sharper than typical taper angle to the cooling lip. However, this would result in a significant portion of the lip being structurally weakened and a significant length of the lip being too thin to manufacture practically without deforming the material. The weakened structure would be susceptible to thermal buckling under hot streaking conditions.

Accordingly, it is desirable to reduce the thickness of the cooling lip trailing edge bluff surface without diminishing the structural integrity of the cooling lip.

SUMMARY OF THE INVENTION

The above-mentioned need is met by the present invention which provides a gas turbine combustor liner that includes an annular panel section having a cooling nugget formed on one end thereof. An annular cooling lip is formed on the cooling nugget so as to define a cooling slot. The cooling lip includes a hot side, a cold side and a trailing edge surface. The hot side defines a compound taper for minimizing the thickness of the trailing edge surface. In one embodiment, the compound taper includes a first tapered surface disposed on a forward portion of the cooling lip and a second tapered surface disposed on an aft portion of the cooling lip, wherein the second tapered surface has a greater taper than the first tapered surface.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
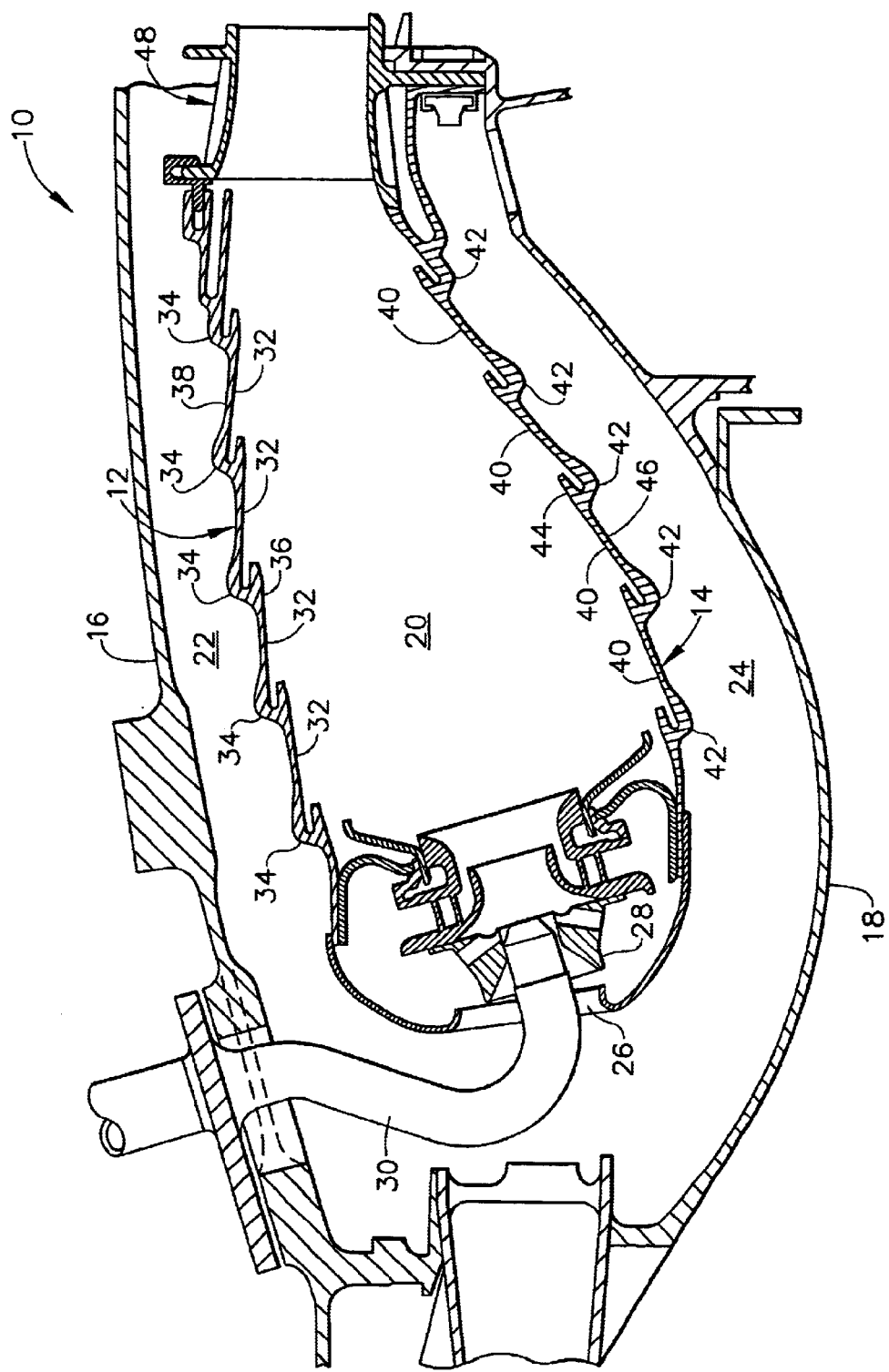
FIG. 1 is a longitudinal sectional view of a gas turbine combustor having the combustor liners of the present invention.

Referring to the drawings wherein identical reference numerals denote the same elements throughout the various views, FIG. 1 shows a combustor 10 of the type suitable for use in a gas turbine engine. The combustor 10 includes an outer liner 12 and an inner liner 14 disposed between an outer combustor casing 16 and an inner combustor casing 18. The outer and inner liners 12 and 14 are generally annular in form about a centerline axis and are radially spaced from each other to define a combustion chamber 20 therebetween. The outer liner 12 and the outer casing 16 form an outer passage 22 therebetween, and the inner liner 14 and the inner casing 18 form an inner passage 24 therebetween. As is known in the art, compressed air is supplied from a compressor (not shown) located upstream of the combustor 10. The compressed air passes principally into the combustor chamber 20 to support combustion. This air passes partially through an opening 26 located forward of the outer and inner liners 12, 14 and partially through a number of liner holes (not shown in FIG. 1) fed from the outer and inner passages 22, 24, some of which is used to cool the liners 12, 14.

A plurality of circumferentially spaced swirler assemblies 28 (only one shown in FIG. 1) is mounted at the upstream ends of the outer and inner liners 12 and 14. Each swirler assembly 28 receives compressed air from the compressor and fuel from a corresponding fuel tube 30. The fuel and air are swirled and mixed by swirler assemblies 28, and the resulting fuel/air mixture is discharged into combustion chamber 20. The fuel/air mixture is ignited by one or more igniters (not shown) that are disposed around the circumference of the outer liner 12. It is noted that although FIG. 1 illustrates one preferred embodiment of a single annular combustor, the present invention is equally applicable to any type of combustor, including double annular combustors, which uses slot cooled liners.

The outer liner 12 comprises a metal shell having a generally annular and axially extending configuration. The shell includes a plurality of panel sections 32 and an annular cooling nugget 34 formed on the forward end of each panel section 32. The panel sections 32 can be an integrally formed, machined forging or separate pieces of sheet metal joined together by a joining method such as brazing or welding. The outer liner 12 has a hot side 36 facing the hot combustion gases in the combustion chamber 20 and a cold side 38 in contact with the relatively cool air in the outer passage 22. Similarly, the inner liner 14 comprises a metal shell that includes a plurality of panel sections 40 and an annular cooling nugget 42 formed on the forward end of each panel section 40. The inner liner 14 has a hot side 44 facing the hot combustion gases in the combustion chamber 20 and a cold side 46 in contact with the relatively cool air in the inner passage 24. Each of the outer and inner liners 12, 14 is connected at its aft end to the first stage turbine nozzle structure 48.

Figure 2:
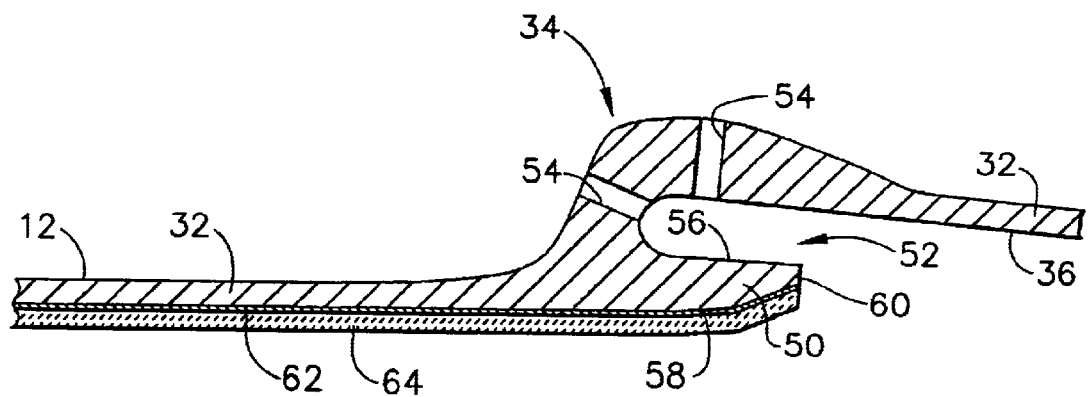
FIG. 2 is a sectional view of a portion of a combustor liner from FIG. 1.

Referring to FIG. 2, one of the cooling nuggets 34 of the outer liner 12 is shown in more detail. The cooling nuggets 42 of the inner liner 14 are substantially the same as that of the outer liner and consequently are not described in detail here as the following description is essentially applicable to both liners. The cooling nugget 34 includes an annular overhang or cooling lip 50 formed thereon and spaced radially inward so as to define a cooling slat 52. A series of cooling holes 54 is formed in the cooling nugget 34 to feed cooling air to the cooling slot 52. The cooling lip 50 comprises a cold side 56, a hot side 56, and a bluff trailing edge surface 60. As used herein, the "hot side" of a cooling lip refers to the side facing the hot combustion gases in the combustion chamber, and the "cold side" of a cooling lip refers to the side facing away from the hot combustion gases. In FIG. 2, the cold side 58 is located on the radially outer surface of the cooling lip 50 and the hot side 58 is located on the radially inner surface of the cooling lip 50. As is shown in the Figures, a substantial portion of the cold side 58 defines a linear surface in axial cross-section. In the case of an inner liner cooling nugget 42, the cooling lip has a cold side located on its radially inner surface and a hot side located on its radially outer surface.

The cooling slot 52 is oriented in a substantially axial direction so that cooling air is directed downstream and forms a thin cooling film on the hot side 36 of the downstream panel section 32. The cooling nugget 34 is thicker than the panel section 32 to provide structural stiffening. By virtue of the heat transfer effects of the cooling holes 54, this thicker region tends to be the coolest part of the shell, which further aids the function of providing structural stiffening. The liner hot side 36 can be provided with a thermal barrier coating comprising a bond coat 62 disposed on the liner base material and a ceramic top coat 64 formed on the bond coat 62.

Figure 3:
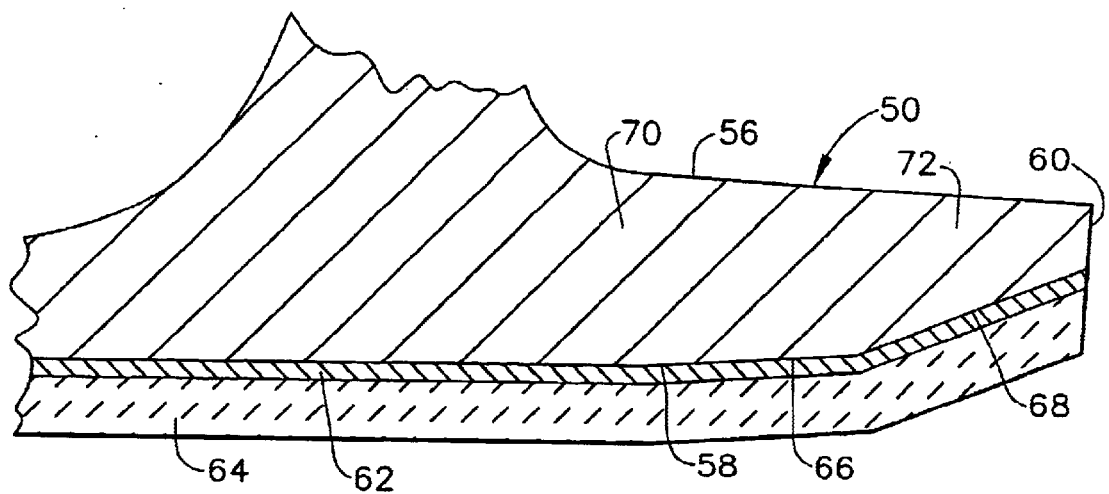
FIG. 3 is an enlarged sectional view of a cooling lip from the combustor liner of FIG. 2.

Turning now to FIG. 3, the hot side 58 of the cooling lip 50 is provided with compound taper to minimize the thickness of the cooling lip trailing edge surface 60. Specifically, the hot side 58 includes a first tapered surface 66 and a distinct, second tapered surface 68. More specifically, the first tapered surface 66 is tapered relative to the linear surface defined by the cold side 58, and the second tapered surface 68 is also tapered relative to the linear surface defined by the cold side 56. The compound taper effectively divides the cooling lip 50 into an upstream or forward portion 70, located adjacent to the cooling lip base and a downstream or aft portion 72, located adjacent to the trailing edge surface 60. The first tapered surface 66 is disposed on the forward portion 70, and the second tapered surface 68 is disposed on the aft portion 72. The aft portion 72 makes up about ⅓ to ⅔ of the total axial length of the cooling lip 50, with the forward portion 70 making up the remainder of the cooling lip length.

In one embodiment, each of the first and second tapered surfaces 66, 68 are substantially linear surfaces in axial cross-section. The first tapered surface 66 defines an angle of approximately 5–10 degrees relative to the cold side 56 of the cooling lip 50. (The cold side 56 is substantially parallel to the flat hot side of the corresponding panel section 32.) The second tapered surface 68 defines an angle of approximately 20–25 degrees relative to the cooling lip cold side 56. The sharper taper on the aft portion 72 provides the bluff trailing edge surface 60 with a minimal thickness, while the shallower taper on the forward portion 70 maintains thickness in the cooler base region so as to provide stiffness against lip buckling.

The minimal thickness of the trailing edge surface 60 offsets the added thickness caused by the thermal barrier coating, even when a relatively thick top coat 64 is used, such that the problem of mainstream turbulence at the cooling slot exit is minimized. Furthermore, heat input through the trailing edge surface 60 is reduced significantly because the exposed, uncoated area of the trailing edge surface 60 is smaller than in conventional configurations. This results in a substantial reduction of trailing edge metal temperature and stress.

In one embodiment, a liner 12 is machined from a single forging wherein the cooling slot 52 is plunge cut and the first and second tapered surfaces 66, 68 are machined with a numerically-controlled lathe. (The inner liner 14 can be machined in a similar fashion.) Using the compound taper configuration of the present invention, the trailing edge surface thickness can be as small as can be reliably machined. With current machining technology, a trailing edge thickness of about 0.030 inches can be achieved. Since it is generally impractical to machine a thickness of 0.030 inches over any significant length, the sharper taper of the aft portion 72 allows rapid transition to the thicker forward portion 70 for practical machining. Simply applying a sharper taper angle over the entire length of the cooling lip would less desirable because of the difficulty in machining to a 0.030 inch thickness over a longer length. Furthermore, the forward portion of the cooling lip would also be thinner such that the cooling lip would be structurally weakened.

The foregoing has described a combustor liner having cooling lips with a compound taper. The compound taper provides a smaller trailing edge surface while maintaining the structural integrity of the lip. While specific embodiments of the present invention have been described, it will be apparent to those skilled in the art that various modifications thereto can be made without departing from the spirit and scope of the invention as defined in the appended claims.

What is claimed is:

1. A gas turbine combustor liner comprising:

an annular panel section having a cooling nugget formed on one end thereof; and an annular cooling lip formed on said cooling nugget so as to define a cooling slot, said cooling lip having a hot side, a cold side and a trailing edge surface, wherein an aft portion of said cold side defines a rectilinear surface in cross-section and said hot side defines a first tapered surface that defines a rectilinear surface in cross-section and is tapered relative to said rectilinear surface of said cold side and a second tapered surface that defines a rectilinear surface in cross-section and is adjacent to said trailing edge surface and is tapered relative to said rectilinear surface of said cold side, said second tapered surface having a greater taper relative to said rectilinear surface of said cold side than said first tapered surface.

2. The liner of claim 1 wherein said first tapered surface defines an angle of about 5–10 degrees relative to said linear surface and said second tapered surface defines an angle of about 20–25 degrees relative to said liner surface.

3. The liner of claim 1 further comprising a thermal barrier coating formed on said hot side.

4. The liner of claim 1 further comprising:

a second annular panel section having a second cooling nugget formed on one end thereof, said second panel section being joined to said first-mentioned panel section; end a second annular cooling lip formed on said second cooling nugget so as to define a second cooling slot, said second cooling lip having a second hot side, a second cold side and a second trailing edge surface, wherein at least a portion of said second cold side defines a second linear surface in cross-section end said second hot side defines a third tapered surface that is tapered relative to said second linear surface and a fourth tapered surface that is adjacent to said second trailing edge surface and is tapered relative to said second linear surface, said fourth tapered surface having a greater taper relative to said second linear surface than said third tapered surface.

5. A gas turbine combustor liner comprising:

an annular panel section having a forward end and an aft end and a cooling nugget formed on said forward end;

an annular cooling lip formed on said cooling nugget so as to define a cooling slot, said cooling lip having a hot side, a cold side and a trailing edge surface wherein an aft portion of said cold side defines a rectilinear surface in cross-section; and a plurality of cooling holes formed in said cooling nugget for supplying cooling air to said cooling slot;

wherein said hot side includes a first tapered surface that is disposed on a forward portion of said cooling lip and is tapered relative to said rectilinear surface and a second tapered surface that is disposed on an aft portion of said cooling lip and is tapered relative to said rectilinear surface, said first and second tapered surfaces each defining a rectilinear surface in cross-section and said second tapered surface having a greater taper relative to said rectilinear surface of said cold side than said first tapered surface.

6. The liner of claim 5 wherein said first tapered surface defines an angle of about 5–10 degrees relative to said linear surface and said second tapered surface defines an angle of about 20–25 degrees relative to said linear surface.

7. The liner of claim 5 further comprising a thermal barrier coating formed on said hot side.

8. The liner of claim 5 further comprising:

a second annular panel section having a forward end end an aft end and a second cooling nugget formed on said forward end thereof, said second panel section being joined at its forward end to said aft end of said first-mentioned panel section;

a second annular cooling lip formed on said second cooling nugget so as to define a second cooling slot, said second cooling lip having a second hot side, a second cold side and a second trailing edge surface wherein at least a portion of said second cold side defines a second linear surface in cross-section; and a second plurality of cooling holes formed in said second cooling nugget for supplying cooling air to said second cooling slot;

wherein said second hot side includes a third tapered surface that is disposed on a forward portion of said second cooling lip and is tapered relative to said second linear surface and a fourth tapered surface that is disposed on an aft portion of said second cooling lip and is tapered relative to said second linear surface, said fourth tapered surface having a greater taper relative to said second linear surface than said third tapered surface.

* * * * *

UNITED STATES PATENT AND TRADEMARK OFFICE
CERTIFICATE OF CORRECTION

PATENT NO. : 6,675,582 B2
DATED : February 13, 2004
INVENTOR(S) : Joseph D. Monty et al.

It is certified that error appears in the above-identified patent and that said Letters Patent is hereby corrected as shown below:

<u>Title page, Item [54] and Column 1, line 1,</u>
Title should read -- SLOT COOLED COMBUSTOR LINER --.

<u>Column 5,</u>
Line 48, "end" should be -- and --.
Line 54, "end" should be -- and --.

<u>Column 6,</u>
Line 33, "end end" should be -- end and --

Signed and Sealed this

Thirteenth Day of April, 2004

JON W. DUDAS
*Acting Director of the United States Patent and Trademark Office*